United States Patent [19]

Baer

[11] Patent Number: 5,127,764
[45] Date of Patent: Jul. 7, 1992

[54] CLIP RING SPREAD PREVENTER
[75] Inventor: Mark Baer, Linden, Pa.
[73] Assignee: Shop Vac Corporation, Williamsport, Pa.
[21] Appl. No.: 690,664
[22] Filed: Apr. 24, 1991
[51] Int. Cl.⁵ .............................................. B25G 3/00
[52] U.S. Cl. ................................... 403/316; 403/326; 411/522
[58] Field of Search ............... 411/522, 523, 524, 539, 411/540, 541; 403/315, 316, 326

[56] References Cited

U.S. PATENT DOCUMENTS

| | | |
|---|---|---|
| 372,883 | 12/1907 | Adams . |
| 1,181,303 | 5/1916 | Froehlich . |
| 2,026,454 | 12/1935 | Benzing . |
| 2,210,811 | 8/1940 | Kelpsch . |
| 2,592,942 | 4/1952 | Moore . |
| 2,945,712 | 7/1960 | Lewis . |
| 3,340,760 | 9/1967 | Wormser . |
| 3,595,123 | 7/1971 | Wurzel . |
| 4,040,602 | 8/1977 | Foster, Sr. . |
| 4,182,578 | 1/1980 | Livesay et al. ............ 403/326 X |
| 4,405,251 | 9/1983 | Kolchinsky et al. ........ 403/326 X |
| 4,757,751 | 7/1988 | Munoz . |

Primary Examiner—Andrew V. Kundrat
Attorney, Agent, or Firm—Ostrolenk, Faber, Gerb & Soffen

[57] ABSTRACT

For preventing the spread, that is the radial widening, of the sides of a clip ring, a retainer or spread preventer is provided in the shape of a cup washer with the internal periphery of its annular ring part sized to engage the outer sides of the clip ring to prevent the clip ring sides from spreading. The clip ring may be disposed on a shaft, and the clip ring may be caused to spread wide by the shaft being moved axially, which draws the clip ring against a stationary abutment, and the retainer prevents such spreading.

6 Claims, 2 Drawing Sheets

CLIP RING SPREAD PREVENTER

BACKGROUND OF THE INVENTION

The present invention concerns a clip ring that is applied to a grooved shaft, or is applied for the like purposes, and the invention relates to a device that prevents the clip ring from spreading and moving out of the groove on the shaft, when the shaft is moved axially while the clip ring is blocked from moving along with the shaft.

A clip ring, also sometimes known as a locking disk, spring retainer, spring clip, or the like, is generally a U-shaped or horseshoe shaped ring with an opening into one side that is wide enough to enable the clip ring to be passed over the shaft at the groove. The clip ring has two sides that are joined by a web at the closed side of the clip ring. The two sides are spaced apart, and particularly the inner periphery of the central opening of the clip ring is of a smaller diameter than the outer diameter of the shaft and is usually at least approximately the diameter of the floor of the groove in the shaft so that the clip ring is held in position on the shaft by the side walls that define the groove. The clip ring on the shaft is typically abutted against another surface for preventing the clip ring and the shaft on which it is located from moving past the abutment. Force applied to the shaft to move it tends to bend the clip ring and as the force becomes greater, the clip ring spreads wider or radially outward at its open or split side until it is wide enough to slip out of the groove and separate from the shaft. This often can occur when the clip ring on the shaft is pressing against an abutment and is opposing the force applied to the shaft by the tightening of a threaded nut onto a screw threaded section of the shaft, which draws the shaft in one direction. There are other numerous applications for clip rings where the shaft on which it is mounted is drawn to press the clip ring against the abutment.

Clip rings are of course well known. Examples are found in the prior art, including U.S. Pat. Nos. 2,026,454 and 3,595,123. Other such locking devices are known as in U.S. Pat. Nos. 3,340,760 and 4,040,602. None of the prior art appears to teach means for preventing the clip ring from spreading.

SUMMARY OF THE INVENTION

The present invention concerns a retainer or spread preventer for preventing the clip ring from spreading wider or radially outward and from moving out of the groove. The spread preventer of the invention includes an inwardly facing surface that is supported outside the clip ring and that has a shape that cooperates with the outward shape of the clip ring such that as soon as the clip ring begins to spread, its outer periphery engages the surface which prevents further spreading of the clip ring. In one preferred form, the spread preventer is at least an annular inwardly facing surface on a ring around the periphery of the clip ring. The clip ring has an annular periphery. The annular inner surface of the spread preventer engages the annular periphery of the clip ring to prevent the ring from spreading outward radially.

In a preferred form, the spread preventer is generally cup shaped, e.g. it may be a cup washer. The inwardly facing surface located radially outside of the clip ring projects axially from an axial end wall of the cup washer. The closed side of the spread preventer abuts that side surface of the clip ring which is to be pressed against an abutment that would prevent further movement of the clip ring. In other words, the closed side of the cup would be between the clip ring and the surface that the clip ring is intended to abut.

The internal diameter of the closed side of the cup, that is the internal diameter of the cup, is preferably the external diameter of the shaft. This diameter is selected to provide no space between the internal periphery of the cup washer and the shaft into which space a part of the clip ring may be bent or drawn. The combination as described converts the simple clip ring into more of a permanent shoulder that acts, in effect, like a permanent ledge.

Other objects and features of the present invention will be understood from the following description of a preferred embodiment of the invention considered in conjunction with the accompanying drawings.

DESCRIPTION OF THE PREFERRED EMBODIMENT

The present invention concerns an assembly 10 which in its most basic elements comprises the shaft 12 on which the invention is disposed, the clip ring 20 to be held on the shaft and the clip ring spread preventer or retainer 40.

Figure 1:
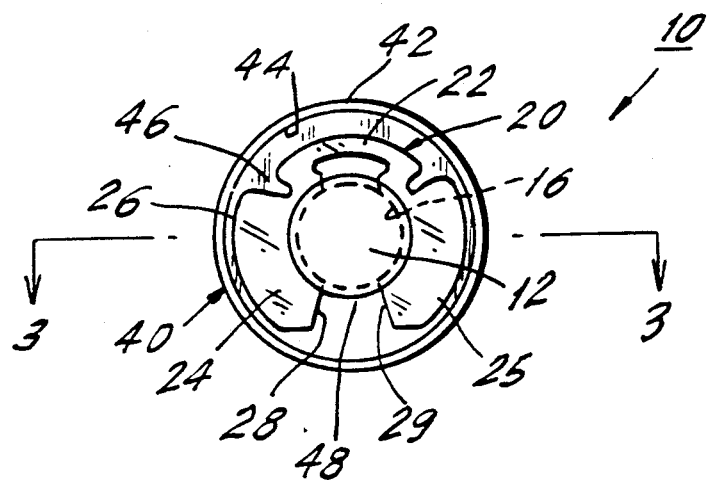
FIG. 1 is an end view of a clip ring and a spring preventer combination assembled together and on a shaft, according to the invention.
Figure 2:
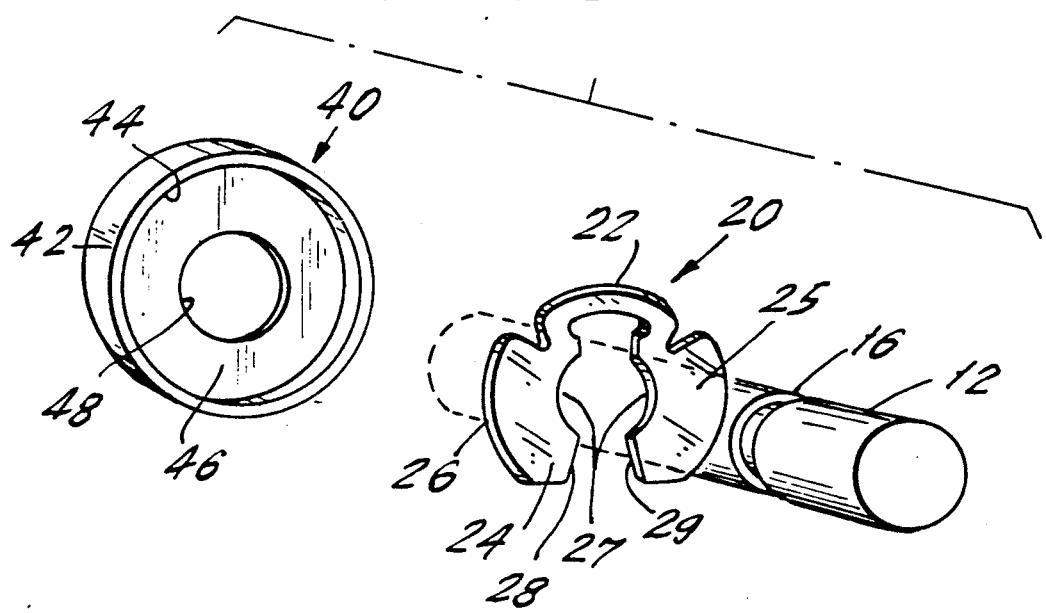
FIG. 2 is an exploded perspective view of the elements shown in FIG. 1.
Figure 3:
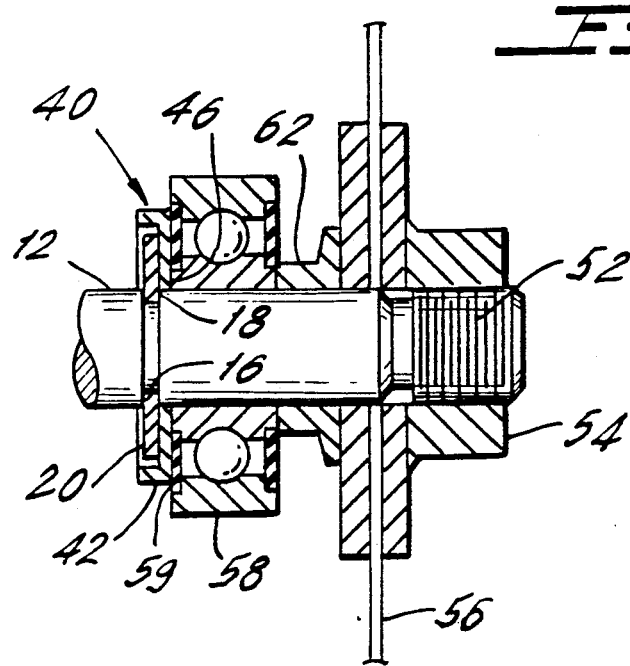
FIG. 3 illustrates a typical installation for a clip ring and clip ring spread preventer according to the invention.
Figure 4:
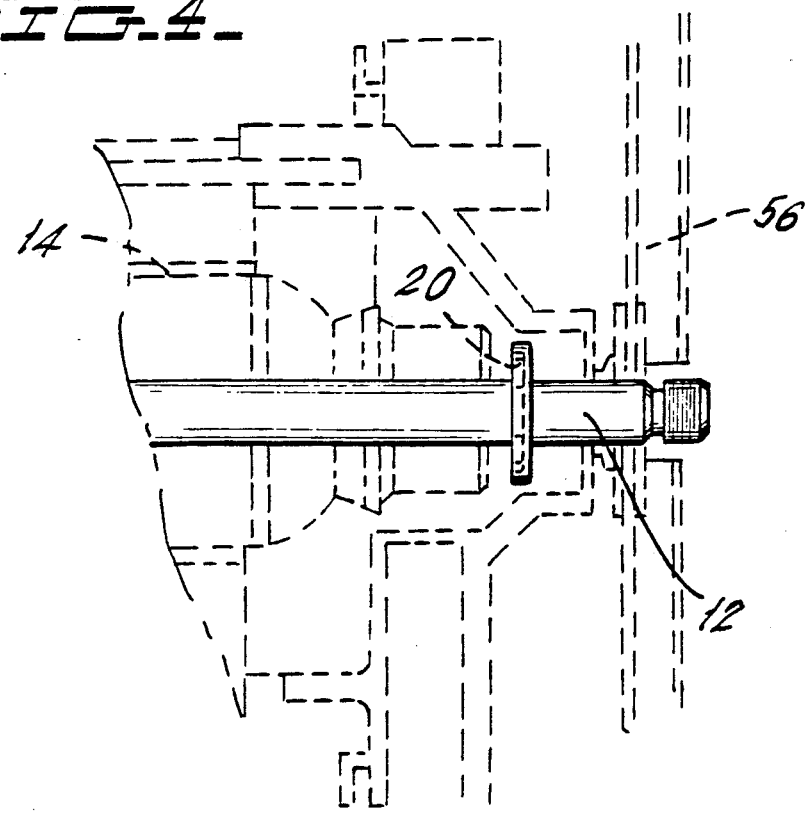
FIG. 4 shows the location of such an installation in association with a drive motor.

As shown in FIGS. 3 and 4, the shaft 12 may be a standard drive shaft driven by an electric motor 14. Along the length of the shaft, a groove 16 is defined in the shaft, e.g. by milling, for receiving the spring clip 20. The shaft 12 has a constant outer diameter and at the groove 16, the outer diameter is reduced by the depth of the groove. In other respects, the shaft 12 is a standard drive shaft driven in the usual manner by the motor 14. Further details of the shaft 12 are considered below with reference to the illustrated application for the shaft.

The clip ring 20 is of standard design. It is not a complete circle or ring. It is comprised of metal and is thick and heavy enough to be stiff and resilient while being sufficiently flexible to be mounted in and removed from the shaft groove 16. The clip ring 20 includes the flexible but resilient web 22, which is out of direct contact with the shaft and is thin enough as to be flexed when the clip is placed on and removed from the shaft 12. The web is connected with the sides 24, 25 of the clip ring which are considerably wider than the web 22 and are inflexible. The sides 24, 25 of the clip ring are for placement on the opposite sides of an object, typically the shaft 12. The outer peripheral surfaces 26 of the sides are together circular in shape to cooperate with the below described retainer 40. Other shapes may be used for the outer peripheral surfaces 26, even a straight wall shape, and the internal periphery of the retainer or spread preventer 40 would be correspondingly shaped.

The inner peripheries 27 of the sides 24, 25 are shaped internally to wrap sufficiently around the shaft 12 that they hold the clip ring 20 to the shaft once it is installed in the groove, yet the sides are spaced apart sufficiently between their free ends 28, 29 that the clip ring can be pushed radially onto the shaft at the groove and can be removed therefrom radially with only slight deformation of the resilient web 22. The internal periphery 27 of the sides 24 and 25, with the clip ring undeformed or resiliently self biased to its undeformed condition, together define a circle that is smaller in diameter than the outer diameter of the shaft 12 and that may be smaller than or greater than the outer diameter of the bottom of the groove 16, so that the clip ring would normally be trapped in the groove. This is an otherwise standard clip ring used to prevent the shaft 12 on which it is mounted from being moved past an abutment 59 against which the clip ring 20 would normally be pressed. However, if the shaft 12 is moved axially with sufficient force that the clip ring is pressed against the abutment 59 to deform the clip ring, then the spread preventer or retainer of the invention 40 is needed.

The retainer or spread preventer 40 of the present invention is illustrated as cup shaped, including an annular peripheral ring portion 42 having an annular, internal, radially inwardly facing surface 44 that prevents the clip ring from spreading. The cup shaped retainer 40 also includes an axial end wall or surface 46 through which passes an opening 48 that is of approximately the same diameter as the diameter of the shaft 12, so that the retainer can be slid along the shaft and so that there is substantially no clearance between the interior of the opening 48 and the shaft 12. The wall 46 of the retainer 40 is next to the groove 16, but not in it. The end wall 46 of the cup washer 40 prevents deformation of the clip ring axially along the shaft 12 while the internal surface 44 prevents spread of the clip ring sides 24, 25 radially outwardly.

The external periphery 26 of the sides of the clip ring is shown as circular and the internal periphery 44 of the annular ring 42 is correspondingly rounded and of substantially the same diameter as the external periphery 26 so that spread of the clip ring will be prevented. The retainer 40 is open on one axial side. The clip ring is initially axially outside the retainer to enable the clip ring sides to be spread sufficiently to be positioned on the shaft and is later outside the retainer to enable the clip ring sides to be removed from the shaft. After being mounted on the shaft, the clip ring is moved axially into the open side of the retainer and against its closed end wall 46, and the retainer prevents spreading of the clip ring while it is inside the retainer. If the clip ring has a differently shaped external periphery, e.g. its sides have substantially straight walls, then the shape of the internal periphery of the clip ring would be correspondingly modified so that the internal periphery 44 would still press against the external periphery of the clip ring and prevent the spreading of its sides.

An application for the clip ring and its spread preventer or retainer is illustrated in FIGS. 3 and 4. The shaft 12 has a threaded end portion 52 on which the internally threaded nut 54 is to be tightened. There is a fixed support plate 56 on which the shaft is axially movably supported. When the nut 54 is tightened on the thread 52, it draws the shaft axially to the right in FIGS. 3 and 4. Means are needed for preventing the shaft from so shifting beyond a specified amount. The shaft is supported for rotation in the standard bearing 58. The axially outer side 59 of the bearing 58 defines the abutment past which the combined assembly 10 is not to be moved. The bearing 58 is supported by washer and spacer 62 at the appropriate distance from the support plate 56. That support prevents the bearing from shifting to the right. The clip ring 20 in the groove 16 would normally abut the adjacent outer side 59 of the bearing 58. But if the nut 54 were tightened with excess force, as often happens during installation, the shaft 12 would be pulled to the right with such force as to bend and deform the clip ring 20 particularly at its web 22 and the clip ring would be spread wider and move out of its groove 16. To prevent this from occurring, the spread preventer or retainer 40 of the present invention is assembled onto the shaft 12 so that its supporting end wall 46 abuts the side 59 of the housing of the bearing 58. The peripheral ring 42 around the preventer/retainer is abutted by the external periphery 26 of the clip ring sides when the force on the shaft 12 exceeds a predetermined level. That abutment prevents further spreading and radial outward movement of the clip ring, holding it in the groove 16. Further, because the end wall 46 extends inward to the surface of the shaft 12 at its opening 48, the internal peripheral edge 27 of the clip ring cannot be deformed out of the groove along the shaft or into the inside of the bearing and cannot be bent. The cup washer 40 combines with the clip ring 20 to define a permanent shoulder system 10.

FIG. 4 shows a typical motor and motor shaft installation, which is not described in detail because that installation is optional. One skilled in the art would recognize the various stationary and rotary components in this typical installation where the invention might be employed.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. An installation employing a clip ring and a retainer, said clip ring and said retainer being disposed on a shaft, wherein:

the clip ring is generally U-shaped, with two sides for application on opposite sides of the shaft and a web of the clip ring joining the sides, the clip ring being deformable at least at the web for enabling the sides of the clip ring to spread wider for installation of the clip ring sides at opposite sides of the shaft and for removal of the clip ring sides from the shaft, said clip ring being sufficiently resilient at least at the web thereof to enable the clip ring to expand and be forced over the shaft and then return to its original shape around the shaft; the sides of the clip ring having respective outer surfaces which, when engaged, prevent the sides from being spread outwardly from each other;

the retainer comprises means defining inwardly facing surfaces opposed to the outer surfaces on the clip ring sides, said inwardly facing surfaces being so placed that upon starting of the spreading apart of the sides of the clip ring, the outer surfaces of the clip ring engage the inwardly facing surfaces of the retainer, said retainer including means for holding the inwardly facing surfaces stiffly for preventing their deformation outwardly when abutted by the outwardly spreading outer surfaces of the clip ring;

said inwardly facing surface defining means has opposite axial sides, one of said axial sides being positioned for being abutted by one axial side of the clip ring, said retainer wall preventing the clip ring from further axial movement;

said retainer wall and said clip ring have openings therethrough, said openings are substantially aligned, and said shaft extends through said openings;

said shaft has a groove of narrow diameter, said clip ring is disposed such that the inner peripheries of the sides of the clip ring are in the groove, and the groove and the spring clip are so shaped and sized and the retainer is so positioned that the retainer is next to the clip ring and out of the groove in the shaft;

the installation further comprises means for supporting the shaft, means for drawing the shaft in one direction, and an abutment disposed around the shaft and axially spaced from the clip ring in the groove, the wall of the retainer being positioned between the clip ring on one side and the abutment on the other side such that said wall of the retainer prevents deformation of said clip ring upon axial movement of said shaft towards said abutment.

2. The combination of claim 1, wherein the clip ring sides have respective internal peripheries which define the opening between the clip ring sides, and the opening through the retainer wall is relatively wider.

3. The combination of claim 1, wherein the internal peripheries of the clip ring sides are substantially arcuate, and the opening through the retainer wall is circular.

4. The combination of claim 3, wherein the circle defined by the arcuate internal peripheries of the sides of the clip ring has a relatively smaller diameter while the diameter of the opening through the retainer wall is relatively larger.

5. The combination of claim 4, wherein the outer surface of each side of the clip ring is generally arcuate and the means defining the inwardly facing surface of the retainer is a circular ring of a diameter approximately that of the diameter defined by the two arcs of the outsides of the clip ring sides.

6. The combination of claim 1, wherein the outer surface of each side of the clip ring is generally arcuate and the means defining the inwardly facing surface of the retainer is a circular ring of a diameter approximately that of the diameter defined by the two arcs of the outsides of the clip ring sides.

* * * * *